United States Patent [19]
Unterberger

[11] 3,753,134
[45] Aug. 14, 1973

[54] METHOD OF MAPPING PERMAFROST BY ELECTROMAGNETIC RADIATION TO INDICATE THICKNESS THEREOF

[75] Inventor: Robert R. Unterberger, Fullerton, Calif.

[73] Assignee: Chevron Research Company, San Francisco, Calif.

[22] Filed: Oct. 4, 1971

[21] Appl. No.: 186,376

Related U.S. Application Data
[63] Continuation of Ser. No. 626,084, March 27, 1967, abandoned.

[52] U.S. Cl. .................................... 324/6, 324/4
[51] Int. Cl. ......................... G01v 3/12, G01v 3/16
[58] Field of Search ............................. 324/4, 6

[56] References Cited
UNITED STATES PATENTS
| | | | |
|---|---|---|---|
| 2,139,460 | 12/1938 | Potapenko | 324/6 X |
| 2,426,918 | 9/1947 | Barret | 324/6 |
| 2,657,380 | 10/1953 | Donaldson | 324/6 X |
| 2,659,882 | 11/1953 | Barret | 324/6 X |
| 3,286,163 | 11/1966 | Holser et al. | 324/6 |

*Primary Examiner*—Gerard R. Strecker
*Attorney*—A. L. Snow

[57] ABSTRACT

A method for accurately and quickly mapping the thickness of the permafrost zone of an earth formation from a movable vehicle, say an aircraft, by transmitting electromagnetic radiation through the zone from a known geographic location on or above the permafrost's surface, detecting a portion of energy reflected from the remote interface, or bottom, of the permafrost zone, and recording the two-way travel time of the energy reflected from the bottom of the permafrost zone so as to indicate permafrost thickness as a function of the known geographic location of the electromagnetic radiation system.

2 Claims, 7 Drawing Figures

INVENTOR
ROBERT R. UNTERBERGER

BY Ralph L. Freeland
Harold D. Messner
ATTORNEYS

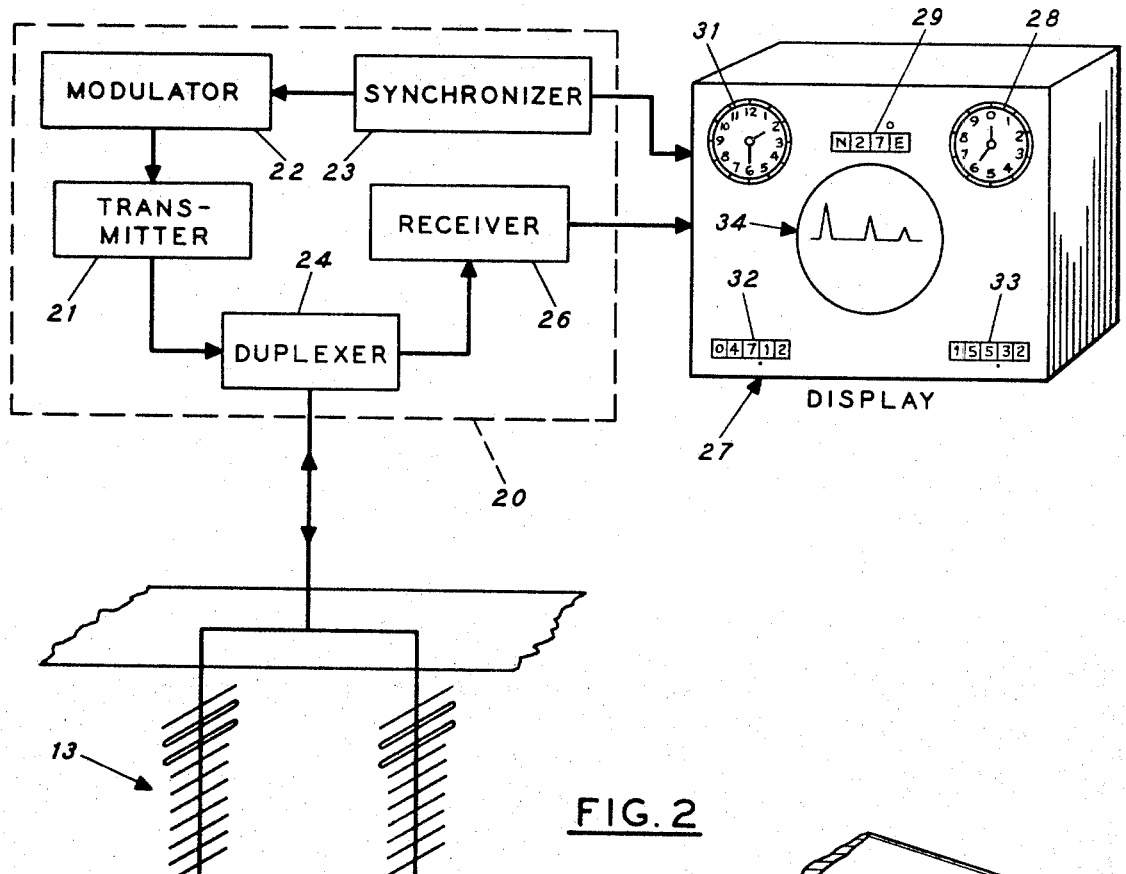
FIG. 2
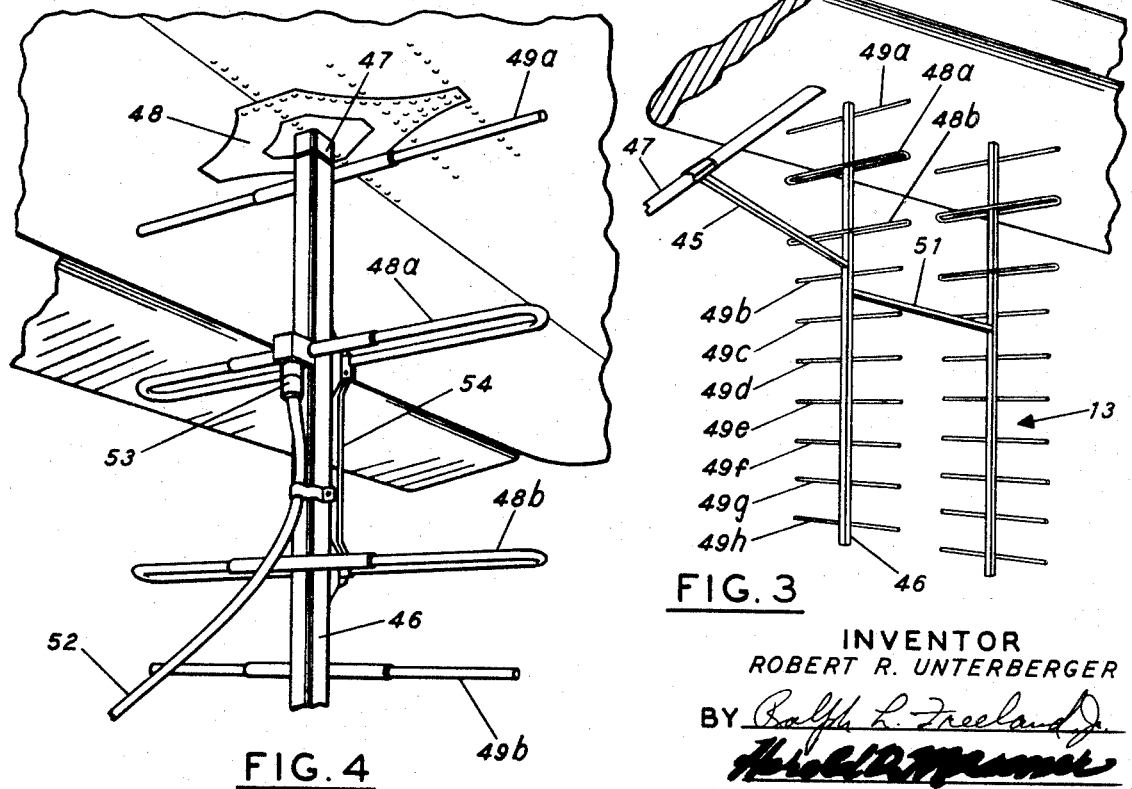
FIG. 4
FIG. 3
INVENTOR
ROBERT R. UNTERBERGER

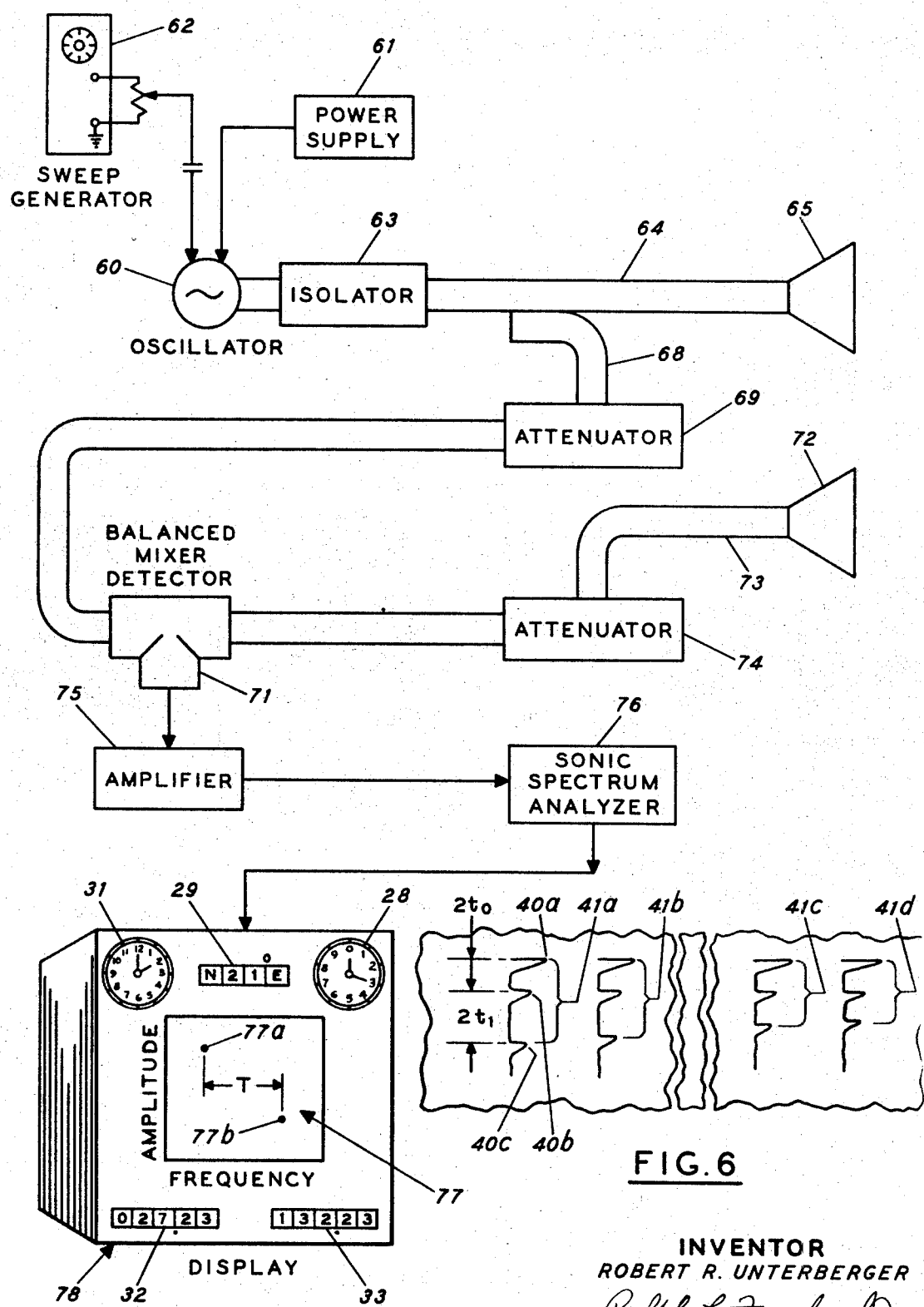

METHOD OF MAPPING PERMAFROST BY ELECTROMAGNETIC RADIATION TO INDICATE THICKNESS THEREOF

This is a continuation of application Ser. No. 626,084, filed Mar. 27, 1967, now abandoned.

BACKGROUND OF THE INVENTION

The present invention relates to a method of mapping the thickness of a permafrost zone of an earth formation. Permafrost regions are located at the more northerly and southerly extents of the world's vast land areas and are defined as the perennially frozen layers of earth formation which have remained below zero degrees centigrade for many years (Robert F. Black, "Permafrost — A Review," Bull. of G.S.A. 65, 839, 1954).

More particularly, the present invention relates to a method for accurately and quickly mapping the thickness of the permafrost zone of an earth formation from a movable vehicle, say an aircraft, by transmitting electromagnetic radiation through the zone from a known geographic location on or above the permafrost's surface, detecting a portion of energy reflected from the remote interface, or bottom of the permafrost zone, and recording the two-way travel time of the energy reflected from the permafrost bottom so as to indicate the thickness of the permafrost as a function of the known geographic location of the electromagnetic radiation system.

Among the problems of conducting seismic surveys in the vast perennially frozen land regions of the world, such as Greenland, Canada, Alaska, Iceland, Spitsbergen, Siberia and the Antarctic, is interpreting the resulting seismic records to provide a true stratigraphic picture of the surveyed earth formation. Seismologists have known that to correctly interpret seismic records, they must take into account the changes in thickness of the permafrost zone which is characteristic of these vast land areas. This is because the permafrost zone is composed of frozen earth materials, the frozen condition of which increases the velocity of the traversing seismic waves. In this regard, the increase in velocity of the seismic waves can be substantial, say from 6,000 feet/sec. to 19,000 feet/sec. for a given earth material. Accordingly, the effect of the thickness of the permafrost zone on the travel times of the seismic waves, and more importantly, the seismologist's interpretation of the resulting seismic records, is obvious.

Where the changes in permafrost thickness are relatively large and occur rapidly along the seismic record, the seismologist is able to readily detect such changes. More serious problems occur in interpretation, however, either (1) if these changes are relatively small and/or occur over some distance along the record, say, a change in thickness of 200 feet (or less) distributed over a horizontal distance of one-half mile (or more), or (2) if rather large bodies of frozen water, such as lakes, rivers, and so forth, lie within the mapped region. It has been found with regard to (2), above, that the insulation characteristics of many large bodies of water (which can be hidden from an observer at the earth's surface) may cause unforeseen changes in thickness of the permafrost zone. For example, experience has shown that lakes in the Antarctic may have temperatures at their bottoms above freezing, say, 25°C, wherein their tops are frozen and in contact with a mean annual temperature of less than 0°C. The heat source causing this change in thickness of the permafrost zone is believed to be infrared radiation from the sun.

It is, accordingly, a particular object of this invention to provide a novel method of quickly and accurately mapping the thickness of the permafrost zone of an earth formation so that data of a seismic record can be more readily correlated along record profiles to provide a true stratigraphic representation of the mapped earth formation, by transmitting electromagnetic radiation through the permafrost zone from a known geographic location on or above the permafrost's surface, say from an aircraft, detecting a portion of energy reflected from the remote interface, or bottom, of the permafrost zone, and recording the two-way travel time of the energy reflected from the permafrost bottom so as to indicate the thickness of the permafrost as a function of the known geographic location of the electromagnetic radiation system.

While it has been proposed to use electromagnetic radiation for measuring the thickness of ice caps in Greenland and the Antarctic, the transmission of electromagnetic radiation (from either aircraft or surface-moving vehicles) has not heretofore been used to map the thickness of the permafrost zone of an earth formation.

SUMMARY OF THE INVENTION

In a preferred form for carrying out the present invention, an electromagnetic radiation and receiving means is located at a known geographic location atop or above a permafrost zone of an earth formation. The distance to the remote contact, or bottom, of the permafrost zone is then determined by (1) irradiating, by an electromagnetic wave generating means, the permafrost zone with electromagnetic radiation, (2) detecting, by electromagnetic receiving means, the portion of electromagnetic energy reflected from the remote contact of the permafrost zone, and (3) recording the two-way travel time of the energy reflected from the remote contact of the permafrost zone as a function of the known geographic location of the electromagnetic generating and receiving means whereby the thickness of the permafrost zone represented by the two-way travel time of the reflected energy, can be indicated and displayed.

The electromagnetic radiation in accordance with the present invention is desirably pulse modulated for periodic radiation from the electromagnetic radiation means, accordingly, the thickness of the permafrost zone can be determined by the difference in time between the emitted pulse and the pulse reflected from the bottom of the permafrost zone. It should also be noted, however, that the radiation can also be continuous wave (CW) but frequency-modulated in such a way that the frequency of the electromagnetic generating means is varied above and below a preselected center frequency at a rate so that the frequency of the returning electromagnetic energy can be compared instantaneously with that being transmitted and thereafter the frequency difference being interpreted in terms of distance to indicate the thickness of the permafrost zone.

Desirably, the center frequency of the continuous wave electromagnetic radiation or the carrier frequency of the pulse modulated system is selected to optimize its transmission through the frozen structure of the permafrost layer. In this regard, a frequency range from about $10^6$ to $10^{11}$ Hertz has been found to be desirable.

Further objects and advantages of the present invention will be apparent from the following detailed description taken in conjunction with the accompanying drawings which form an integral part of this specification.

DESCRIPTION OF THE DRAWINGS

FIG. 2 illustrates, in block diagram form, the electromagnetic generating, receiving and displaying means useful in the arrangement of FIG. 1;

FIGS. 3 and 4 illustrate one form of the antenna system useful in the arrangement of FIG. 1 including a two-bay transmit-receive array suitably duplexed between the transmitting and receiving means of FIG. 1;

FIG. 6 is a plot of electromagnetic signals received and recorded by the display system of FIG. 5; and FIG. 7 illustrates in block form another generating-receiving means also useful in the arrangement of FIG. 1.

DESCRIPTION OF PREFERRED EMBODIMENTS

Figure 1:
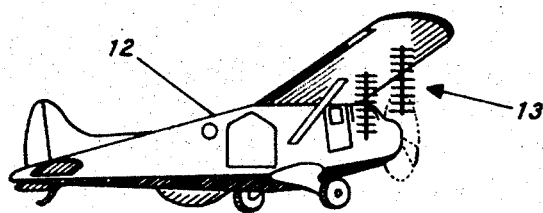
FIG. 1 is a schematic representation of the method of the present invention for detecting and recording the distance to the remote contact of a permafrost layer from a known geographical position above the permafrost zone.
Figure 1:
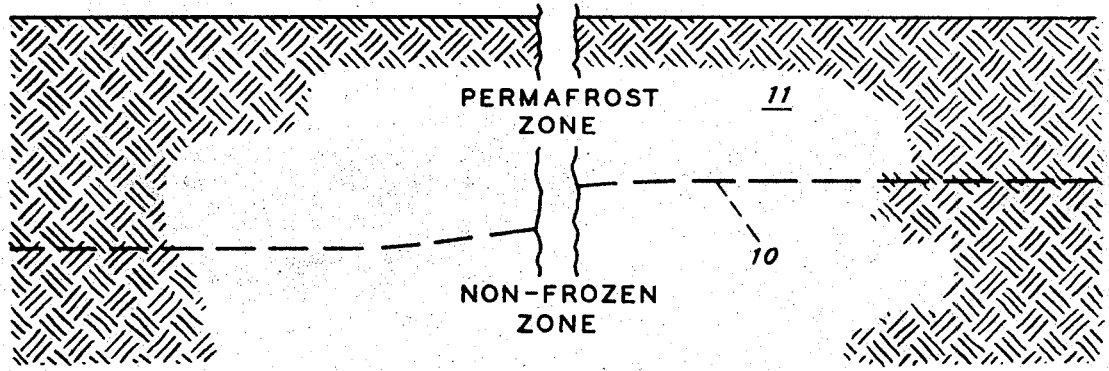

Referring now to the drawings and particularly to FIG. 1, there is schematically indicated a method for the use of the present invention to map the location of the remote contact 10, or bottom, of the permafrost zone 11. The purpose of such mapping is to allow better interpretation of seismic data of the area so that a true stratigraphic picture of the earth formation can be determined. The remote contact 10 of the permafrost zone 11 is not always parallel to the earth's surface but may change slope gradually along a given compass direction as shown. Where the change in thickness of permafrost zone 11 is gradual as a function of linear horizontal distance along the earth's surface, say a change in thickness of 200 feet or less distributed over a horizontal distance of one-half mile or more, seismic data can be erroneously interpreted by the seismologist to suggest sloping earth sediments where none actually exist. Obviously, if the thickness of the permafrost zone 11 is known, the seismologist can better interpret the recorded seismic data in such a manner that he can plot a truly representative map of the surveyed earth formation so as to allow identification of geologic structures where oil deposits are likely to accumulate.

Measurements of the thickness of permafrost layer 11 are directly determined in accordance with the present invention by transmitting pulsed or frequency-modulated electromagnetic energy from a known position atop the permafrost zone, as from aircraft 12. After the energy is transmitted by means of antenna array 13, the portion of energy reflected from the remote contact 10 at the bottom of the permafrost zone is detected by the same or a separate antenna array and then displayed by means of a display system within the interior of the aircraft. By measuring the time between transmission and reception of the electromagnetic energy (by analysis of the outgoing and incoming pulses or by their differences in frequency in an FM system), the thickness of the permafrost zone can be indicated and displayed. A knowledge of the average dielectric constants of the permafrost zone and of air, respectively, is required to interpret the travel time of the emitted and reflected energy in terms of distance.

FIG. 2 illustrates electromagnetic transmitting and receiving circuit 20 for transmitting and receiving electromagnetic radiation. It preferably includes a high-frequency radio transmitter 21 suitably controlled by modulator (pulser) 22 and synchronizing circuit 23. Connected to the output of transmitter 21 is duplexer 24 which suitably controls switching of antenna array 13 from the transmitter 21 to the receiver 26. The output of synchronizing circuit 23 and receiver 26 connects to display unit 27 where an indication of the travel time of the electromagnetic radiation can be displayed as a horizontal distance across the scope face and recorded in suitable fashion.

Figure 5:
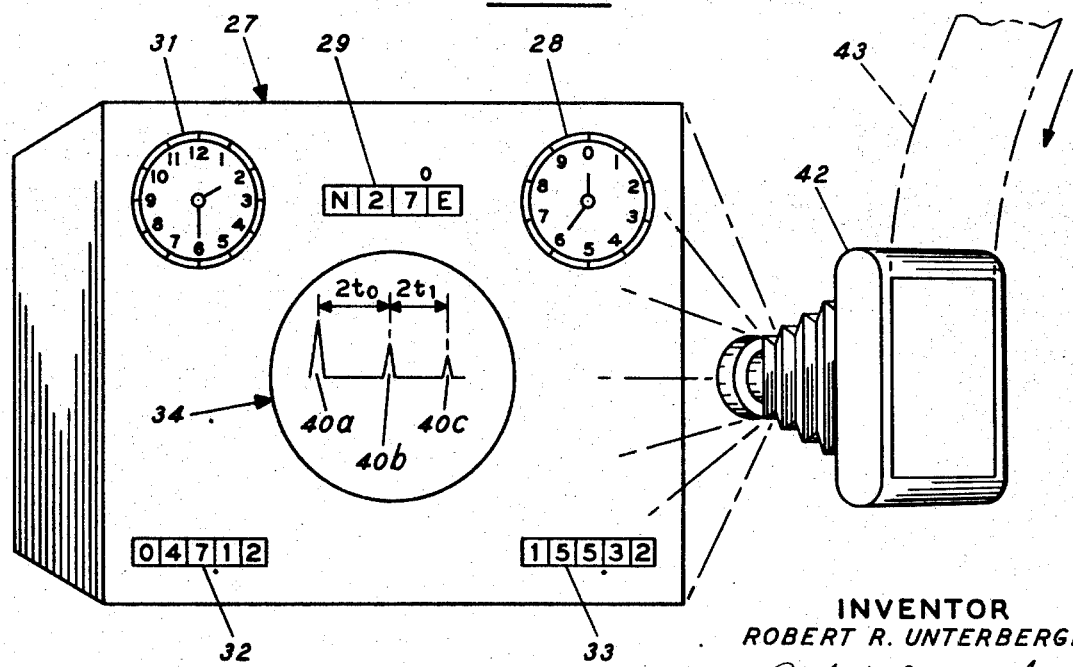
FIG. 5 illustrates, in more detail, the display system of the arrangement of FIG. 2.

FIG. 5 illustrates display unit 27. Display unit 27 includes several indicators: for altitude of the aircraft, 28, for compass headings, 29, for time, clock 31, for geographic location of the aircraft, indicators 32 and 33, and for the two-way travel time display of the electromagnetic radiation emission and return from the permafrost zone, oscilloscope 34. Altitude indicator 28 indicates the elevation of the aircraft above the earth's surface and can be measured by a variety of instruments common to aircraft, for example, an altimeter, as shown. As the location of the permafrost thickness must be related to a given land area, previously seismically mapped, the geographic position of the aircraft must be known at all times. Provided for this purpose are distance indicators 32 and 33 that are part of an electronic position-locating system such as Shoran. Indicators 32 and 33 digitally display distance to the two known locations of the Shoran transmitters. From these display units, the position of the aircraft can be determined at any time. The compass heading indicator 29 also provides useful information during the mapping of the permafrost zone, as, for example, its information can be used to aid in establishing the instantaneous heading of the aircraft during the mapping operation in case of interruption of signals from the two Shoran transmitters. In this regard, the compass heading of indicator 29 is permanently recorded upon each frame of a moving picture film taken of the terrain immediately below the aircraft as the permafrost zone is being mapped. A clock (not shown) similar to clock 31 is superimposed upon each frame of the film. Thus, by relating the time and terrain photographed by the second camera, the signals appearing on oscilloscope 34 may be interpreted in terms of geographic location of the aircraft even though signals from the two slave Shoran transponders have been interrupted.

In carrying out the present invention in conjunction with the display unit 27 of FIG. 5, the remote contact of the permafrost zone is indicated by the two-way travel times ($2t_0$ and $2t_1$) of the reflected pulses 40$b$ and 40$c$ shown on scope 34. In this regard, note that the primary emission pulse is indicated at 40$a$. Reflected pulses 40$b$ and 40$c$ have their origins at the permafrost's surface and at the bottom of the permafrost zone, respectively, where changes in dielectric constant of the different propagational media have occurred. In most cases, the porous water-wet formations in the unfrozen zone immediately below the permafrost zone are so lossy to electromagnetic wave propagation that no signals can be obtained below the remote contact of the permafrost, except, say, where the nonfrozen zone (1) is composed of nonporous (tight) rock formations or (2) is porous but is filled with nonaqueous fluids such as hydrocarbons. Where the permafrost zone itself contains dielectric discontinuities, e.g., bedding of different earth materials, additional signals are also reflected therefrom and then detected and displayed as described in my copending application assigned to the assignee of the present application, entitled "Method of Mapping Bedding Interfaces in a Permafrost Zone of an Earth Formation by Electromagnetic Radiation."

By physically associating the indicators, the information of all units can be simultaneously recorded as by a camera 42 using film 43 which travels across the lens of the camera in the direction indicated. With the time of travel of the pulses along with their velocities in the various propagating media estimated from a knowledge of the probable lithology of the permafrost zone and the velocity of electromagnetic energy in air, the thickness of the permafrost zone can be determined and a two-dimensional map, i.e., a vertical near-surface section, constructed. Furthermore, the mapping area flown over by the aircraft 12 can be enlarged using known mapping techniques, such as having the aircraft fly in a grid pattern. Then, ultimately, a three-dimensional map showing the thickness of the permafrost zone can be constructed.

FIG. 6 is a representation, on film, of the composite reflections of the electromagnetic signals provided by display unit 27 as the aircraft travels along one profile of the permafrost zone. In this application, the oscilloscope has been connected in a suitable manner to display the emitted and reflected pulses 40a, 40b and 40c on the scope face. Time is the vertical axis or short dimension of the film. Each column of pulses represents a composite, or trace, of emitted and received pulses, such as traces 41a, 41b, 41c, 41d, which have occurred during the passage of one frame of film across the lens of the camera photographing the scope face. Furthermore, because travel time $2t_0$ and $2t_1$ of the energy represents depth of the top and bottom of the permafrost zone, respectively, each trace also represents, in a manner explicitly determined by the average dielectric constant of the material between the top and bottom of the permafrost zone, the permafrost thickness over a given instantaneous profile of the mapped region even though the aircraft is continuously moving over the permafrost zone during the mapping operation. Ultimately, the altitude of the aircraft above the permafrost zone can also be indicated by converting the travel time ($2t_0$) represented by the vertical distance between peaks 40a and 40b, in terms of distance. Where the permafrost zone disappears due to the presence of bodies of water not frozen to the bottom, there would be an additional reflected pulse due to the wave reflected from the upper surface of the water in contact with the ice on the body of water. This reflected pulse is not relevant in the determination of the thickness of the permafrost zone.

In carrying out the method of the present invention, the electromagnetic radiation preferably has a frequency within the range of $10^6$ to $10^{11}$ Hertz so as to propagate within the permafrost zone without undue attenuation of the signal. It has been found in the transmission of electromagnetic waves through permafrost that its rock matrix does not unduly attenuate the waves. Transmission of the waves is possible inasmuch as the water within the formation is sufficiently immobilized so that the electric dipole moment of the molecules does not absorb too much of the electromagnetic wave energy. It has been found that the method of the present invention operates with maximum efficiency in the aforementioned frequency range to allow mapping of the thickness of the permafrost zone whether lying near or more remote distances from the earth's surface.

At the remote interface (bottom) of the permafrost zone the amplitude of the reflected signal is dependent upon the reflection coefficient at this depth. As the unfrozen porous sedimentary formation zone below the base of the permafrost contains liquid water, a highly reflective medium, a high percentage of the incident power is reflected.

FIGS. 3 and 4 illustrate antenna array 13 useful with the system of the present invention. Referring to FIG. 3, the antenna array 13 is a Yagi array supported on the aircraft wing as by support stub 45 extending between mast 46 of one of the antennas and airplane strut 47. Preferably, each antenna includes active elements 48a and 48b as well as a series of passive elements for directing the energy in a downwardly directed beam for penetrating the permafrost zone. The passive elements include a reflector element 49a located adjacent to the wing of the aircraft and a series of director elements 49b-49h extending along the mast 46 of the antenna. Between the antennas a central support 51 fixes the mast of each antenna in a parallel array. Passive elements 49a-49h, as well as active elements 48a and 48b, are preferably positioned so that their axes of symmetry are parallel to the line of flight of the aircraft. Accordingly, air resistance of the antenna array during the mapping operation is minimized.

As illustrated in FIG. 4, only the active elements 48a and 48b of each antenna are electrically connected, as by transverse feed arm 54, to axial connector 53 and coaxial line 52, to the transmit-receive circuitry within the aircraft. Adjacent to the reflector element 49a, the near end of the mast 46 of each antenna is also seen to be supported in contact with the aircraft, as by an insulating sleeve 47 having a planar base 48 riveted to the wing of the aircraft. Where greater sensitivity and/or directivity is desired as, for example, when the remote interfaces of the permafrost zone is "mushy" so that its coefficient of reflection is lowered, additional antennas may be added to the array along the wing of the aircraft to increase the antenna gain of the system.

FIG. 7 illustrates, in schematic diagram form, an alternate receiver-transmission system for performing the method of the present invention utilizing frequency-modulated (FM) electromagnetic energy. In mapping the thickness of permafrost regions, occasionally the zone is relatively thin. It is proposed in such cases that a frequency modulation ranging system operative within the aforementioned frequency range be employed to measure these relatively small permafrost thicknesses.

Referring again to FIG. 7, a continuous wave (CW) oscillator 60 is energized by power supply 61 to generate a basic frequency ($f_o$) for the radiating electromagnetic energy. Preferably the basic frequency ($f_o$) is equal to a frequency within a range of $10^6$ to $10^{11}$ Hertz. The oscillator 60 may be a magnetron or klystron capable of operating at the desired frequencies of transmission and at a suitable power output. A sweep generator 62 is synchronized with the oscillator and generates a varying potential at a frequency ($f_m$) say from $10^6$ to $10^{11}$ Hertz, to cause a preferably linear time variation in the transmitted frequency about its center frequency ($f_o$). The output of the oscillator is supplied through an isolator 63 to a transmission line 64 carrying the electromagnetic energy to a transmitting antenna 65. Transmitting antenna 65 is preferably the directional type positioned on a movable vehicle or an aircraft, and directed downward into the permafrost zone. Between isolator 63 and the transmitting antenna 65 is a directional coupler 68 for sampling the frequency of the oscillator 60. The sample signal is supplied through attenuator 69 to a balanced mixer-detector 71. In carrying out the invention in accordance with the present embodiment, receiving antenna 72 is located adjacent to transmitting antenna 65. It connects through transmission line 73 to an attenuator 74 and thence as a second input to balanced mixer-detector 71. At the balanced mixer 71 the outputs of attenuators 69 and 74 are mixed to develop a difference frequency. This difference frequency is fed to amplifier 75. A sonic spectrum analyzer 76 measures the amplitudes and frequencies of the difference signals from the balanced mixer-detector 71 and plots the information on a chart or record 77 within display unit 78. Chart 77 shows two reflected signals: the first, signal 77a, is at the lowest frequency of the system and represents the altitude of the aircraft above the permafrost zone; the second, signal 77b, represents a reflection from the bottom of the permafrost zone. Note that the amplitude of the signal 77b is relatively large because of the large change in dielectric constants at the ice-water interface characteristic which occurs at the bottom of the permafrost zone composed of porous formations. The relationship of the difference in frequency to the distance from the surface of the permafrost to its remote interface is found in the following equation:

Difference in frequency = rate of change of the changing frequency × time between reflections from the upper and lower interfaces of the permafrost layer $\Delta f = R_f \times T$ which can be written as:

$\Delta f = B/(1/2f_m) \times 2d/v$ where $f_m$ = modulation rate
$B$ = band width of the frequency modulation
$d$ = distance from the upper interface to the remote interface of the permafrost, and
$v$ = the velocity of transmission in the permafrost which, for measurement purposes, is equal to:
$v = c/\sqrt{E'/E_o}$ where
$c$ = speed of light in air
$E'$ = the real part of the complex dielectric constant of the permafrost formation at the center frequency
$E_o$ = the real part of the complex dielectric constant of free space By associating the two-way travel time presented by the frequency difference of the emitted and received energy with the information presented on the remaining indicators on display unit 78 such as altimeter 28, gyroscope 29, clock 31, Shoran distance indicators 32 and 33, responding to signals from two slave Shoran transponders at known locations, the thickness of the permafrost zone can be mapped as a function of the geographic location of the aircraft. As previously described, a camera can be utilized to photograph the information contained on display unit 78.

While certain preferred embodiments of the invention have been specifically disclosed, it should be understood that the invention is not limited thereto as many variations will be readily apparent to those skilled in the art, and the invention is to be given its broadest possible interpretation of the following claims. For example, an omnidirectional antenna might be utilized in the method of the present invention if reflected pulses from sources other than the permafrost zone can be identified, or otherwise deleted as on the basis of signal intensity.

I claim:

1. Method of measuring the distance to the bottom of a permafrost zone of an earth formation by means of an electromagnetic generating and receiving means located at a known geographical location adjacent to the upper surface of said permafrost zone to indicate the thickness thereof in a region of the earth in which said permafrost zone has a gradual variation in its depth versus horizontal distance characteristic such that a seismic record of said earth formation contains insufficient data to indicate the change in thickness of said permafrost zone as a function of said horizontal distance, which comprises:
   1. after obtaining said seismic record of said earth formation in which slight changes in permafrost zonal thicknesses are undetectable therefrom, irradiating said permafrost zone with electromagnetic energy within a frequency range of $10^6$ to $10^{11}$ Hertz by actuation of said electromagnetic generating and receiving means,
   2. detecting reflections of the electromagnetic energy from at least said permafrost zone bottom which represents a frozen-unfrozen interface, said interface forming an electro-magnetic discontinuity between the bottom of said permafrost zone and an unfrozen earth zone lying therebelow,
   3. recording the two-way travel time for said energy to travel from substantially the upper surface of said permafrost zone to said remote interface within said permafrost zone and return whereby said travel time may be displayed to delineate the location, depthwise, of said remote interface of said permafrost zone relative to the upper surface, and
   4. utilizing the delineated locations indicative, depthwise, of said remote interface of said permafrost zone of said earth formation to determine static corrections for said seismic record of said same earth formation, which comprise: correlating said delineated locations indicating, depthwise, the remote interface of said permafrost zone to seismic events on said seismic record so as to provide a static correction for each trace of said seismic record, and adjusting each trace of said seismic record in accordance with said determined static correction.

2. The method in accordance with claim 1 in which said permafrost zone depth versus distance characteristic is further characterized by being less than 200 feet per one-half mile or more of horizontal distance, said horizontal distance being measured at the earth's surface.

* * * * *